US00RE40331E

(19) United States
(12) Reissued Patent
Jung et al.

(10) Patent Number: US RE40,331 E
(45) Date of Reissued Patent: May 20, 2008

(54) METHOD FOR CONSTRUCTING WVPN (WIRELESS VIRTUAL PRIVATE NETWORK) FOR CDMA

(75) Inventors: Kwang-Ho Jung, Kyonggi-do (KR); Woo-sic Han, Pusan (KR); Jung-Eun Choi, Seoul (KR)

(73) Assignee: Curitel Communications Inc., Ichon-shi (KR)

(21) Appl. No.: 11/039,455
(22) Filed: Jan. 21, 2005

Related U.S. Patent Documents

Reissue of:
(64) Patent No.: 6,510,327
Issued: Jan. 21, 2003
Appl. No.: 09/347,891
Filed: Jul. 6, 1999

(30) Foreign Application Priority Data

Jul. 10, 1998 (KR) ..... 98-27915

(51) Int. Cl.
*H04Q 7/20* (2006.01)

(52) U.S. Cl. ..... 455/575.1; 455/414.1; 455/554.1; 455/432.1; 455/426.1

(58) Field of Classification Search ..... 455/554.1, 455/414.1, 426.1, 415, 463, 432.1, 433
See application file for complete search history.

(56) References Cited

U.S. PATENT DOCUMENTS 5,339,356 A * 8/1994 Ishii ..... 379/234
5,469,496 A * 11/1995 Emery et al. ..... 455/414.1
5,594,777 A * 1/1997 Makkonen et al. ..... 455/432.1
5,768,271 A * 6/1998 Seid et al. ..... 370/389
5,890,064 A * 3/1999 Widergen et al. ..... 455/426.1
5,949,770 A * 9/1999 Liu et al. ..... 455/433
6,014,377 A * 1/2000 Gillespie ..... 455/415
6,029,067 A * 2/2000 Pfundstein ..... 455/426.1
6,044,264 A * 3/2000 Huotari et al. ..... 455/414.1
6,101,382 A * 8/2000 Granberg ..... 455/414.1
6,212,377 B1 * 4/2001 Dufour et al. ..... 455/426.1
6,256,512 B1 * 7/2001 Verdonk ..... 455/554.1
6,665,532 B1 * 12/2003 Boland et al. ..... 455/415
6,681,119 B1 * 1/2004 Verdonk ..... 455/554.1
6,970,719 B1 * 11/2005 McConnell et al. ..... 455/554.1
2006/0121943 A1 * 6/2006 Zabawskyj et al. ..... 455/432.1

FOREIGN PATENT DOCUMENTS

WO WO 9827783 A1 * 6/1998

* cited by examiner

*Primary Examiner*—Lana Le
(74) *Attorney, Agent, or Firm*—Oblon, Spivak, McClelland, Maier & Neustadt, P.C.

(57) ABSTRACT

A method for construction a WVPN for a CDMA system is disclosed. The method includes a first step for registering a private network group and extension number to the SCP and judging whether a call by a certain calling subscriber corresponds to an extension number or a MDN (Mobile Directory Number) when a certain calling subscriber calls a certain receiving subscriber of the same group as the calling subscriber, and a second step for constructing a mobile communication network using the MDN in the case that as a result of the first step the call by the calling subscriber corresponds to the MDN and constructing a WVPN in the case that the call by the calling subscriber corresponds to the extension number, wherein the method for constructing a WVPN (Wireless Virtual Private Network) for a CDMA system includes a mobile telephone serviced by a private network group, a BTS (Base Transceiver System) for transmitting and receiving a message with the mobile telephone, a BSC (Base Station Controller) for managing the BTS, a MSC (Mobile Switching Center) including a MSA (Mobile Signaling Access), a MCC (Mobile Call Control), and a VLR (Visitor Location Register), a HLR (Home Location Register), and a SCP (Service Control Point) for storing an extension number with respect to a calling subscriber serviced by a private network group, for thereby constructing the WNPN using a certain extension number between subscribers for a WVPN group.

4 Claims, 2 Drawing Sheets

METHOD FOR CONSTRUCTING WVPN (WIRELESS VIRTUAL PRIVATE NETWORK) FOR CDMA

Matter enclosed in heavy brackets [ ] appears in the original patent but forms no part of this reissue specification; matter printed in italics indicates the additions made by reissue.

*More than one reissue application has been filed for the reissue of U.S. Pat. No. 6,510,327. The reissue applications are U.S. patent application Ser. Nos. 11/039,455 (present parent reissue application) and 11/417,250 (divisional reissue application).*

BACKGROUND OF THE INVENTION

1. Field of the Invention

The present intention relates to a CDMA (Code division Multiple Access) system, and in particular to a method for constructing a WVPN (Wireless Virtual Private Network) for a CDMA which makes it possible to construct the WVPN which may use a mobile phone network as a private network.

2. Description of the Background Art

In the conventional CDMA system, in order to construct a VPN (Virtual Private Network), as disclosed in the U.S. Pat. No. 5,339,356, a PBX (Private Branch Exchange) is installed for thereby constructing the VPN.

Therefore, in the conventional art, since the VPN is constructed based on the PBX, the construction cost of the PBX is increased, and an advanced high technique is required for installing the same, so that the installation cost is also increased.

SUMMARY OF THE INVENTION

Accordingly, it is an object of the present invention to provide a method for construction a WVPN for a CDMA system, which is capable of constructing the WNPN using a certain extension number between subscribers for a WVPN group.

To achieve the above object, there is provided a method for constructing a WVPN for a CDMA system comprising the steps of a first step for registering a private network group and extension number to the SCP and judging whether a call by a certain calling subscriber corresponds to an extension number or a MDN (Mobile Directory Number) when a certain calling subscriber calls a certain receiving subscriber of the same group as the calling subscriber, and a second step for constructing a mobile communication network using the MDN in the case that as a result of the first step the call by the calling subscriber corresponds to the MDN and constructing a WVPN in the case that the call by the calling subscriber corresponds to the extension number, wherein the method for constructing a WVPN (Wireless Virtual Private Network) for a CDMA system includes a mobile telephone serviced by a private network group, a BTS (Base Transceiver System) for transmitting and receiving a message with the mobile telephone, a BSC (Base Station Controller) for managing the BTS, a MSC (Mobile Switching Center) including a MSA (Mobile Signaling Access), a MCC (Mobile Call Control), and a VLR (Visitor Location Register), a HLR (Home Location Register), and a SCP (Service Control Point) for storing an extension number with respect to a calling subscriber serviced by a private network group.

Additional advantages, objects and features of the invention will become more apparent from the description, which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiments of the present invention will be explained with reference to the accompanying drawings.

Figure 1:
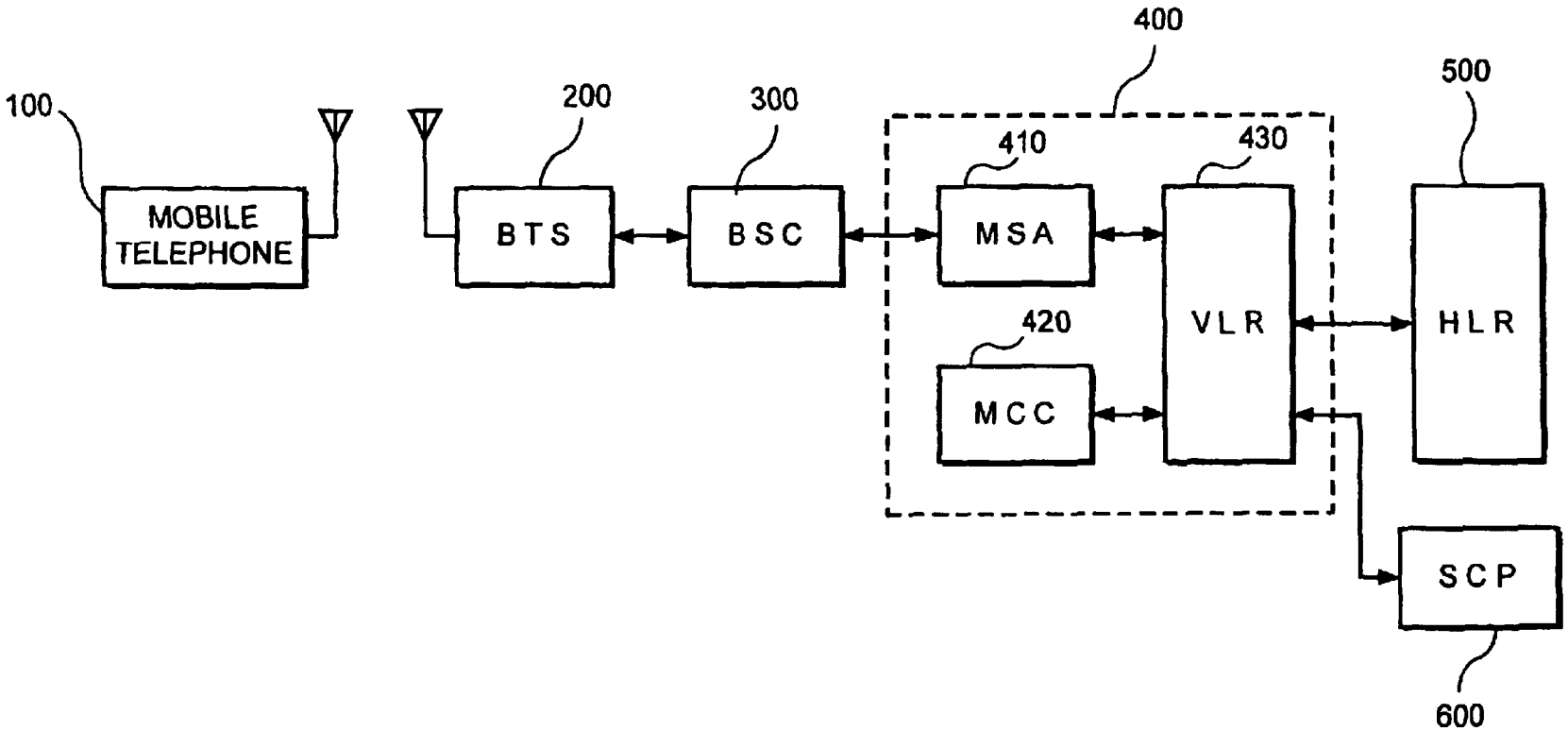
FIG. 1 is a block diagram illustrating a mobile communication system according to the present invention.
Figure 2:
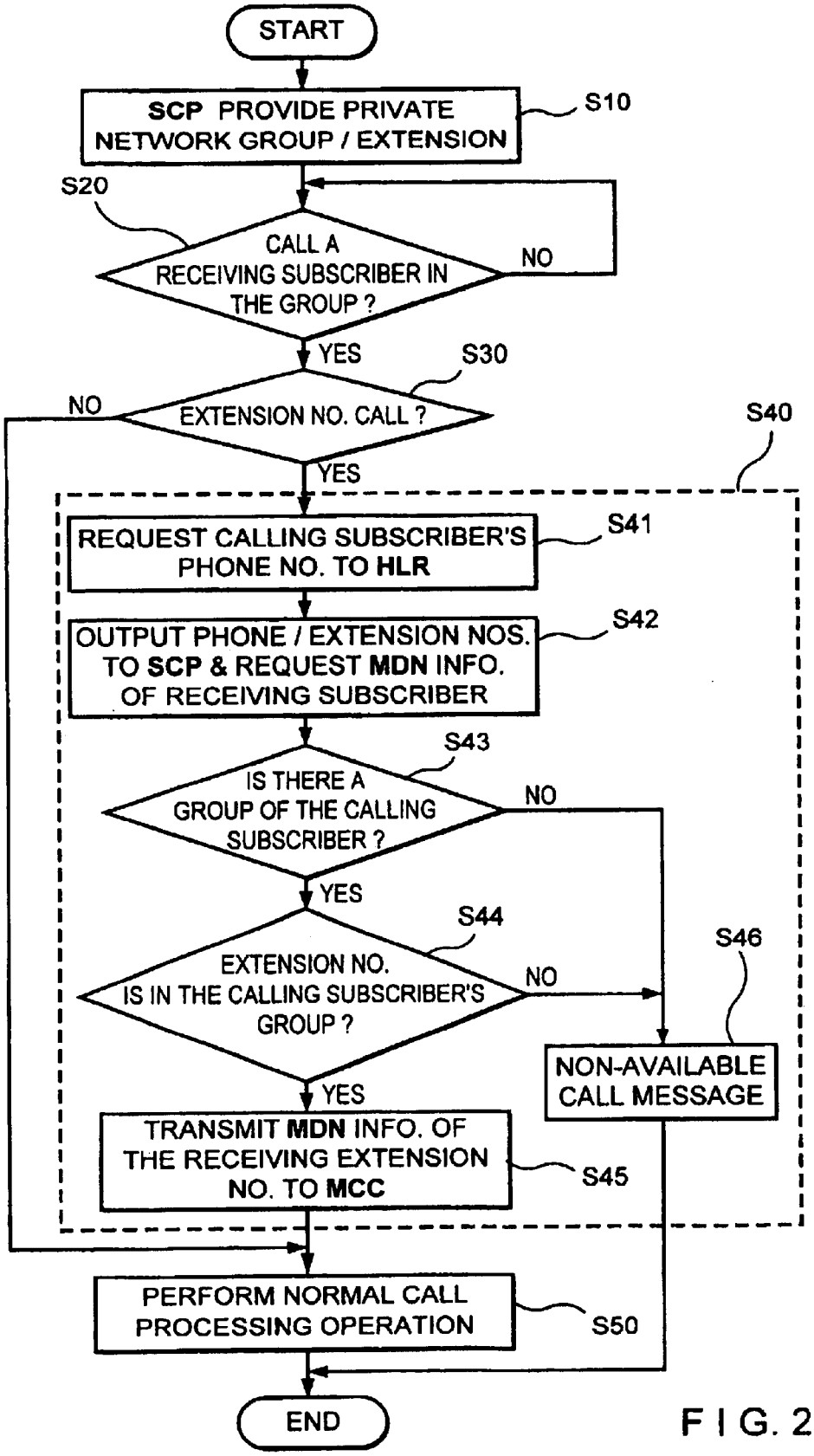
FIG. 2 is a flow chart for explaining a method for constructing a WVPN for a CDMA system according to the present invention.

FIG. 1 is a block diagram illustrating a mobile communication system according to the present invention.

As shown therein, the mobile communication system according to the present invention includes a mobile telephone 100 serviced by a private network group, a BTS (Base Transceiver System) 200 for transmitting and receiving a message with the mobile telephone 100, a BSC (Base Station Controller) 300 for managing the BTS 200, a MSC (Mobile Switching Center) 400 including a MSA (Mobile Signaling Access) 410, a MCC (Mobile Call Control) 420, and a VLR (Visitor Location Register) 430, a HLR (Home Location Register) 500, and a SCP (Service Control Point) for storing an extension number with respect to a calling subscriber serviced by a private network group.

The method for constructing the WVPN for a CDMA system according to the present invention will be explained with reference to the mobile communication system adapted to the embodiment of the present invention.

First, in a step S10, in order to subscribe a private network, a user subscribes the private network at a telephone service company or the like, the telephone service company provides a private network group information, an extension number and a MDN (Mobile Directory Number) corresponding to a subscriber's extension number.

In a step S20, when a certain calling subscriber serviced by the private network group calls a certain receiving subscriber serviced by the same group using the mobile telephone 100, the above-described call is transferred to the MSA 410 of the MSC 400 via the mobile telephone 100, the BTS 200 and the BSC 300.

The MSA 410 receives the call signal from the BSC 300 and transfers the same to the MCC 420.

In a step S30, the MCC 420 receives the call signal from the MSA 410 and judges whether the call by the calling subscriber corresponds to an extension number call or a call using the MDN.

As a result of the judgement of the step S30, the call by the mobile telephone 100 corresponds to the extension number of the receiving subscriber of the same group, since the extension number is formed of three or four digits such as "123" differently from an existing MDN, it is possible to judge whether the call corresponds to the extension number call or a call using the MDN.

As a result of the judgement of the step S30, if the call by he calling subscriber is a call using the MDN, in a step S50, a normal call processing operation is performed.

As a result of the judgement of the step S30, if the call by the calling subscriber corresponds to the extension number call, in the step S40, a process is performed for constructing the WVPN using the mobile communication system as shown in FIG. 1.

The step S40 will be explained in more detail.

First, in a step S41, the MCC 420 requests a telephone number to the VLR 430 with respect to the calling subscriber, and the VLR 320 requests the telephone number to the HLR 500 with respect to the calling subscriber, and the HLR 500 transmits the telephone number with respect to the calling subscriber to the MCC 420 via the VLR 430.

In a step S42, the MCC 420 receives a telephone number of the calling subscriber transmitted via the VLR 430 and outputs the telephone number and the extension number of the calling subscriber to the SCP 600 and requests a MDN information of the receiving subscriber corresponding to the extension number.

In a step S43, the SCP 600 receives a calling subscriber telephone number from the MCC 420 and judges whether there is a group of the calling subscriber telephone.

As a result of the judgement of the step S43, in a step S44, it is judged whether the extension number is in the group of the calling subscriber.

As a result of the judgement of the step S44, if the extension number is in the group of the calling subscriber, in a step S45, the MDN information corresponding to the receiving extension number is transmitted to the MCC 420 via the VLR 430.

In a step S50, the MCC 420 performs a normal call processing operation based on the MDN information corresponding to the receiving extension number inputted via the VLR 430, so that the calling subscriber is connected with the receiving subscriber.

As a result of the step S43, if there is not a group of the telephone number of the calling subscriber, and as a result of the step S44, if the received extension number is not in the group of the calling subscriber, in a step S46, the calling subscriber is informed of a non-available call message for thereby performing a control operation.

As described above, a private network group information and an extension number are registered in the SCP of the mobile communication system, and a telephone communication is implemented between the subscribers registered in the private network group using the extension number, so that the PBX is not used for constructing the private network in the present invention, whereby it is possible to decrease the cost of the PBX and the installation cost of the same.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A method for constructing a WVPN (Wireless Virtual Private Network) for a CDMA system which includes a mobile telephone serviced by a private network group, a BTS (Base Transceiver System) for transmitting and receiving a message with the mobile telephone, a BSC (Base Station Controller) for managing the BTS, a MSC (Mobile Switching Center) including a MSA (Mobile Signaling Access), a MCC (Mobile Call Control), and a VLR (Visitor Location Register), a HLR (Home Location Register), and a SCP (Service Control Point) for storing an extension number with respect to a calling subscriber serviced by a private network group, a method for constructing a WVPN for a CDMA system comprising the steps of:

a first step for registering a private network group and extension number to the SCP and judging whether a call by a certain calling subscriber corresponds to an extension number or a MDN (Mobile Directory Number) when a certain calling subscriber calls a certain receiving subscriber of the same group as the calling subscriber;

a second step for constructing a mobile communication network using the MDN in the case that as a result of the first step the call by the calling subscriber corresponds to the MDN and constructing a WVPN in the case that the call by the calling subscriber corresponds to the extension number;

a first sub-step for requesting a telephone of the calling subscriber to the HLR, transmitting a telephone number and extension number to the SCP with respect to the calling subscriber, requesting a MDN information of the receiving subscriber, and judging whether there is a group of the telephone number of the calling subscriber;

a judgement sub-step for judging whether the extension number transmitted to the SCP exists in the group of the calling subscriber in the case that when there is the group of the telephone number of the calling subscriber as a result of the judgement of the first sub-step;

and including a sub-step for transmitting a non-available call connection guide message to the calling subscriber in the case that the extension number does not exist in a group of the telephone number of the calling subscriber as a result of a judgement as to whether there is a group of the telephone number of the calling subscriber based on a judgement whether an extension number transmitted to the SCP exists and in the case that the extension number exists in the group of the calling subscriber as a result of a judgement of the judgement sub-step.

2. A method for constructing a WVPN (Wireless Virtual Private Network) for a COMA system which includes a mobile telephone serviced by a private network group, a BTS (Base Transceiver System), a BSC (Base Station Controller), a MSC (Mobile Switching Center) including a MSA (Mobile Signalling Access), a MCC (Mobile Call Control), and a VLR (Visitor Location Register), a HLR (Home Location Register), and a SCP (Service Control Point) comprising the steps of;

a first step for registering a private network group and extension number to the SCP and judging whether a call by a certain calling subscriber corresponds to an extension number or a MDN (Mobile Directory Number) when a certain calling subscriber calls a certain receiving subscriber of the same group as the calling subscriber; and a second step for constructing a mobile communication network using the MDN in the case that as a result of the first step the call by the calling subscriber corresponds to the MDN and constructing a WVPN in the case that the call by the calling subscriber corresponds to the extension number, wherein said second step includes:

a first sub-step for requesting a telephone of the calling subscriber to the HLR, transmitting a telephone number and extension number to the SCP with respect to the calling subscriber, requesting a MDN information of the receiving subscriber, and judging whether there is a group of the telephone number of the calling subscriber; a second sub-step for judging whether the extension number transmitted to the SCP exists in the group of the calling subscriber in the case that when there is the group of the telephone number of the calling subscriber as a result of the judgment of the first sub-step;

a third sub-step for constructing the WVPN by transmitting the MDN corresponding to the receiving extension number to the MCC In the case that the extension number exists in the group of the calling subscriber as a result of the judgment of the second sub-step; and a fourth sub-step for transmitting a non-available call connection guide message to the calling subscriber in the case that there is not a group of the telephone number of the calling subscriber as a result of the judgement of the first sub-step and in the case that the extension number does not exist in the group of the calling subscriber as a result of the judgement of the second sub-step.

3. A method for constructing a WVPN (Wireless Virtual Private Network) for a CDMA system which includes a mobile telephone serviced by a private network group, a BTS (Base Transceiver System), a BSC (Base Station Controller), a MSC (Mobile Switching Center) including a MSA (Mobile Signalling Access), a MCC (Mobile Call Control), and a VLR (Visitor Location Register), a HLR (Home Location Register), and a SCP (Service Control Point) comprising the steps of;

a first step for registering a private network group and extension number to the SCP and judging whether a call by a certain calling subscriber corresponds to an extension number or a MDN (Mobile Directory Number) when a certain calling subscriber calls a certain receiving subscriber of the same group as the calling subscriber; and a second step for constructing a mobile communication network using the MDN in the case that as a result of the first step the call by the calling subscriber corresponds to the MDN and constructing a WVPN in the case that the call by the calling subscriber corresponds to the extension number, wherein said second step includes:

a first sub-step for requesting a telephone of the calling subscriber to the HLR, transmitting a telephone number and extension number to the SCP with respect to the calling subscriber, requesting a MDN information of the receiving subscriber, and judging whether there is a group of the telephone number of the calling subscriber;

a second sub-step for judging whether the extension number transmitted to the SCP exists in the group of the calling subscriber in the case that when there is the group of the telephone number of the calling subscriber as a result of the judgment of the first sub-step;

a third sub-step for constructing the WVPN by transmitting the MDN corresponding to the receiving extension number to the MCC in the case that the extension number exists in the group of the calling subscriber as a result of the judgment of the second sub-step; and a fourth sub-step for transmitting a non-available call connection guide message to the calling subscriber in the case that there is not a group of the telephone number of the calling subscriber as a result of the judgement of the first sub-step and in the case that the extension number does not exist in the group of the calling subscriber as a result of the judgement of the second sub-step and in the case that the extension number exists in the group of the calling subscriber as a result of the judgement of the second sub-step.

*4. A method for constructing a WVPN (Wireless Virtual Private Network) for a CDMA system which includes a mobile telephone serviced by a private network group, a BTS (Base Transceiver System), a BSC (Base Station Controller), a MSC (Mobile Switching Center) including a MSA (Mobile Signaling Access), a MCC (Mobile Call Control), and a VLR (Visitor Location Register) a HLR (Home Location Register), and a SCP (Service Control Point), comprising the steps of;*

*a first step for registering a private network group and extension number to the SCP and judging whether a call by a calling subscriber corresponds to an extension number or a MDN (Mobile Directory Number) when the calling subscriber calls a receiving subscriber of the private network group; and*

*a second step for constructing a mobile communication network using the MDN in the case that as a result of the first step the call by the calling subscriber corresponds to the MDN and constructing a WVPN in the case that the call by the calling subscriber corresponds to the extension number, wherein said second step includes:*

*a first sub-step for requesting a telephone number of the calling subscriber to the HLR, transmitting the telephone number of the calling subscriber and the extension number to the SCP, requesting a MDN information of the receiving subscriber, and judging whether there is a group with the telephone number of the calling subscriber;*

*a second sub-step for judging whether the extension number transmitted to the SCP exists in the group with the calling subscriber in the case that when there is the group with the telephone number of the calling subscriber as a result of the judgment of the first sub-step;*

*a third sub-step for constructing the WVPN by transmitting the MDN corresponding to the receiving extension number to the MCC in the case that the extension number exists in the group with the calling subscriber as a result of the judgment of the second sub-step; and*

*a fourth sub-step for transmitting a non-available call connection guide message to the calling subscriber in the case that there is not a group with the telephone number of the calling subscriber as a result of the judgment of the first sub-step or in the case that the extension number does not exist in the group of the calling subscriber as a result of the judgment of the second sub-step.*

* * * * *